United States Patent [19]

Gandolfo

[11] Patent Number: 4,760,641

[45] Date of Patent: Aug. 2, 1988

[54] APPARATUS FOR LOADING AND UNLOADING X-RAY FILM CASSETTES

[75] Inventor: Rino Gandolfo, Roccavignale, Italy

[73] Assignee: Minnesota Mining and Manufacturing Company, St. Paul, Minn.

[21] Appl. No.: 24,180

[22] Filed: Mar. 10, 1987

[30] Foreign Application Priority Data

Mar. 12, 1986 [IT] Italy ................................ 19728 A/86

[51] Int. Cl.⁴ ............................................. B23P 19/00
[52] U.S. Cl. .................................................... 29/806
[58] Field of Search ............................. 29/806; 53/266

[56] References Cited

U.S. PATENT DOCUMENTS 4,541,173  9/1985  Sakuma et al. ........................ 29/806
4,694,571  9/1987  Kanai et al. ........................... 29/806

*Primary Examiner*—Timothy V. Eley
*Attorney, Agent, or Firm*—Donald M. Sell; Mark A. Litman

[57] ABSTRACT

This apparatus comprises an x-ray film cassette, comprising first light-tight housing means for a feeding magazine including unexposed x-ray films, second light-tight housing means for the cassette, magazine handling means operating in said first housing means for removing an unexposed x-ray film from the feeding magazine, cassette handling means operating in said second housing means for removing an exposed x-ray film from the cassette and introducing an unexposed x-ray film into the cassette, powered actuator means for said magazine and cassette handling means and interfunctional service means for said actuator means and cassette and magazine handling means, characterized by comprising:

(a) a plurality of distinct and superimposed units, each comprising a self-supporting structure (6,7,8), said plurality including:
  i. one ground unit (1), containing the major portion of said interfunctional service means,
  ii. one cassette-carrying unit (2), containing said second housing means and said cassette handling means,
  iii. at least one magazine-carrying unit (3), containing said first housing means and said magazine handling means,
(b) light-tight connecting means between superimposed units.

The overall dimensions of the apparatus are a function of the number of the magazine-carrying units. When a reduced number of magazine-carrying units is sufficient, the apparatus is compact and has more limited overall dimensions.

14 Claims, 8 Drawing Sheets

APPARATUS FOR LOADING AND UNLOADING X-RAY FILM CASSETTES

The present invention in general refers to the day-light automatic handling of x-ray films.

More in particular, the present invention regards an apparatus of the day-light loading and unloading of x-ray film cassette, of the type comprising means for the light-tight housing of unexposed x-ray film feeding magazines, means for the light-tight housing of an exposed x-ray film including or not including radiographic cassettes, means for opening and closing said cassettes, means for introducing into and taking out an x-ray film from the cassette and for carrying it from and towards said cassette, means for taking out a film from a feeding magazine and pneumatic or motor-driven actuator means for each or all of said means.

An apparatus for the loading and unloading of x-ray film cassettes of the above specified type is known for instance from DE-OS No. 3,122,583. It consists of a closed supporting frame which at the top includes a cassette-carrying unit and at the bottom defines a plurality of housings to introduce a predetermined number of magazine-carrying units one below the other. This construction has the drawback that the number of the magazine-carrying units, which can be used, is small since limited by the dimensions of the housing of the frame; furthermore the apparatus has of course dimensions suitable for the highest number of foreseen magazine-carrying units and such dimensions remain unchanged even when the number of such units required for some applications is lower than the highest allowed number. In such cases, a more compact apparatus of smaller dimensions would be desirable.

The present invention avoids the above said drawbacks and provides an x-ray film loading and unloading apparatus having a modular structure which can be conformed to dimension needs, and in particular conformed to the number of magazines effectively used.

The invention also provides a compact, functional and easily assemblable and disassemblable loading and unloading apparatus.

Another aspect of the present invention is that of providing a loading and unloading apparatus wherein there is easy accessibility to the inside of its single functional units (as hereinafter described to the purposes of the invention) for the inspection thereof.

Such aspects of the invention are reached with an apparatus for day-light loading and unloading of an x-ray film cassette, comprising first light-tight housing means for a feeding magazine including unexposed x-ray films, second light-tight housing means for the cassette, magazine handling means operating in said first housing means for removing an unexposed x-ray film from the feeding magazine, cassette handling means operating in said second housing means for removing an exposed x-ray film from the cassette and introducing an unexposed x-ray film into the cassette, powered actuator means for said magazine and cassette handling means and interfunctional service means for said actuator means and cassette and magazine handling means, characterized by comprising:

(a) a plurality of distinct and superimposed units, each comprising a self-supporting structure, said plurality including:
 i. one ground unit, containing the major portion of said interfunctional service means,
 ii. one cassette-carrying unit, preferably placed in contact with said ground unit, containing said second housing means and said cassette handling means,
 iii. at least one magazine-carrying unit, preferably placed in contact with said cassette-carrying unit, containing said first housing means and said magazine handling means, (b) light-tight connecting means between superimposed units (which are preferably placed in contact with each other).

Such an apparatus has a differentiated structure based on the following: a ground unit, as herein above described, a cassette-carrying unit, a (first) magazine-carrying unit, optional (additional) magazine-carrying units, one of said cassette- or magazine-carrying units being in contact with the ground unit.

When no optional magazine-carrying units are used, a minimum configuration of the apparatus is obtained, which can be later expanded by addition of further magazine-carrying units. To make such addition easier, the cassette-carrying unit is preferably placed under said (first) magazine-carrying units and additional magazine-carrying units are optimally placed on said first magazine-carrying unit.

The superimposed units have a parallelepiped, preferably flat, structure having at least top and bottom open faces. The side faces may be light-tight closed; in that case, light-tight connecting means may usefully comprise means such as a perimetrical rubber gasket between said superimposed units.

In one preferred aspect, the present invention refers to the above apparatus characterized by said self-supporting structure being a top and side open parallelepipedal structure in which said light-tight connecting means include a peripherical element providing for first edge means (such as ledges 11 and 12 of the drawings hereinafter described) attached to said structure and removable light protecting shields providing for second edge means (such as edges or wings 16 and 17 of such drawings) for light-tight engagement with said first edge means.

In a particular aspect, the present invention refers to the above apparatus characterized by said self-supporting structure being an open parallelepipedal structure comprising a quadrangular plate, upright support elements secured to said plate, an upper supporting frame carried by said support elements and said light-tight connecting means comprising removable light protecting shields secured to said self-supporting structure. The unit is substantially open at its sides and the base and top plates include predetermined openings as internal path means along the various units.

In a more particular aspect, the present invention refers to the above apparatus characterized by said upper supporting frame having associated therewith a perimetrical (L- or C-shaped) channel section element with an outwardly turned recess delimited by upper and/or lower ledges and the above removable light protecting shields having upper and lower edges for complementary engaging in said recess (with upper or lower ledges of said channel section element).

In this way, the apparatus may be easily assembled and opened for maintenance operations.

The upper magazine-carrying unit may have a top light-tight closed or, preferably, top open face. In the latter, the apparatus further comprises a top protecting element light-tight connected to said upper magazine-carrying unit. In case such units are open and provided with channel section elements for engagement with said removable light protecting shields, such top protecting element is preferably provided with a lower edge for light-tight engagement with the channel section element of the upper magazine-carrying unit. With reference to the channel section elements, they should have both upper and lower horizontal ledges (C-shaped) when a unit (e.g. a magazine-carrying unit) is placed between two intermediate units (e.g. between a cassette-carrying unit and a magazine-carrying unit). However, if an intermediate unit is connected with a terminal unit (e.g. a top protecting element or a ground unit), the channel section element between said two units may have only one horizontal (lower or upper) ledge (L-shaped) for engagement with the corresponding edge of the shield of the intermediate unit when the shield of the terminal unit is otherwise light-tight connected to the apparatus structure.

Furthermore, the upper supporting frame of each unit preferably defines a vertical edge which provides for centering of the superimposed unit.

The cassette-carrying units and the magazine-carrying unit have a quadrangular flat profile and the removable light protecting shields are four for each unit: three are secured to the corresponding unit with internal screw fastening means, while internal latch engagement means are provided to lock from the outside in a releasable way a fourth protecting shield. Said latch engagement means are cinematically interconnected and a single external control element is provided for the simultaneous engagement and release.

The external control element consists of a vertical axis revolving upper knob carrying a face cam profile cooperating with a swinging lever which operates a vertical rod carrying the above said latch engagement elements; the rod consists of portions, each associated with a respective magazine and cassette carrying units and joined together by means of joint connections.

The overall dimensions of the apparatus are a function of the number of the magazine-carrying units. In this way, in those applications where the use of a reduced number of magazine-carrying units is sufficient, the apparatus is compact and has more limited overall dimensions.

In its minimum configuration aspect, the present invention refers to an apparatus for day-light loading and unloading of an x-ray film cassette, comprising a first light-tight housing means for a feeding magazine of unexposed x-ray film, a second light-tight housing means for the cassette, a magazine handling means operating in the first housing means for removing an unexposed x-ray film from the feeding magazine, a cassette handling means operating in the second housing means for removing an x-ray film from the cassette and for introducing an unexposed x-ray film into the cassette, powered actuator means for said film handling means and for said cassette handling means, interfunctional service means for said actuator means, characterized by comprising:

(a) a plurality of distinct and superimposed units, each comprising a self-supporting structure, said plurality including:
  (i) a ground unit containing the major portion of said interfunctional service means,
  (ii) a cassette-carrying unit placed in contact with the ground unit, containing said second housing means and said cassette handling means,
  (iii) a magazine-carrying unit placed in contact with the cassette-carrying unit, containing said first housing means and said magazine handling means,
  (iv) a top protecting unit placed in contact with the magazine-carrying unit, (b) light-tight connecting means, between said units, including:
  (i) an upper supporting frame attached to said self-supporting structure of each of said ground unit and cassette-carrying unit,
  (ii) a perimetrical channel section element attached to said upper supporting frame with an outwardly turned recess,
  (iii) removable light protecting shields around said cassette-carrying unit light-tight engaged in the recess of said channel section element.

Further features and advantages of the present invention will be shown in the following detailed description which is made with reference to the drawings supplied as mere non-limiting examples, where.

Figure 1:
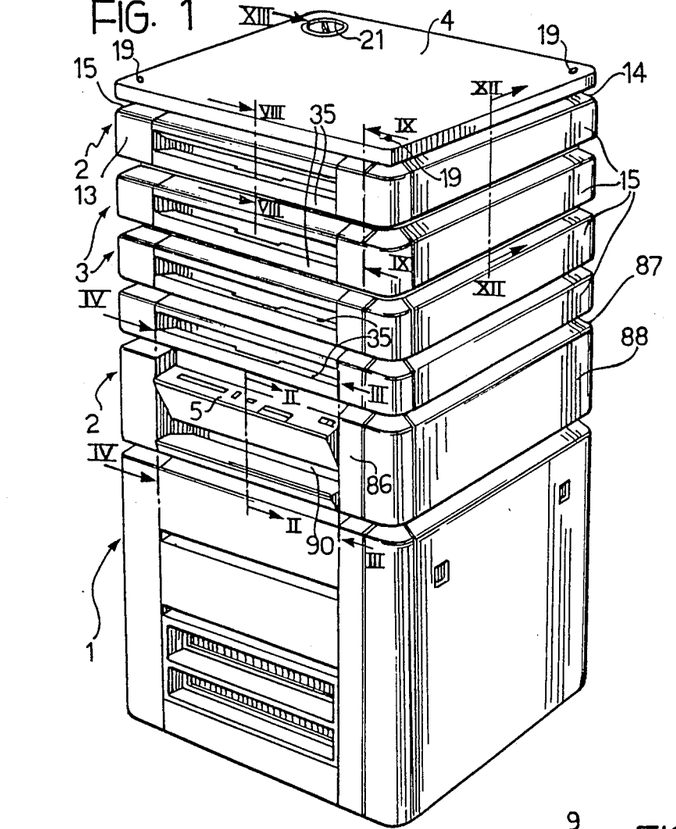
FIG. 1 is a perspective view of an x-ray film loading and unloading apparatus according to the present invention.

The loading and unloading apparatus according to the present invention, shown as a whole in FIG. 1, essentially comprises a parallelepiped-shaped ground unit 1, a cassette-carrying unit 2 secured at the top of the ground unit 1, a series of magazine-carrying units 3 (in the illustrated example four magazine-carrying units) placed one on the other above the cassette-carrying unit 2 and a top protecting unit 4 placed on the upper magazine-carrying unit 3. As shown hereinafter with more details, every unit 1, 2 and 3 has a supporting metallic structure to support the various components of every unit and a protecting light-tight external paneling consisting of molded plastic material component elements.

Ground unit 1 supports the cassette-carrying unit 2 and the magazine-carrying units 3 and embodies pressurized air feeding source and relative valve and distribution means connected with various actuator means of units 2 and 3 which will be described hereinafter, as well as most of electrical equipment and relative circuits connected with various position sensors provided also in units 2 and 3 and controlled by an electronic processing and controlling means to operate the apparatus according to programmed operation cycles which can be monitored by means of a programming and controlling panel 5 applied on the front side of the cassette-carrying unit 2. Such processing and controlling means, as well as other pneumatic and electrical components whose major portion is contained inside the ground unit 1, are not shown and, for sake of brevity, are not described in detail: such components are (per se) conventional to the man skilled in the art and have been referred to, to the purposes of the present invention, as interfunctional service means.

With reference now in details to FIGS. 7 to 11, one of the magazine-carrying units 3 will be now described in details. A different number of such units can be used in the apparatus according to the present invention depending upon the employment needs. Magazine-carrying units 3 are all the same and therefore the following description can be applied to each of them.

Figure 7:
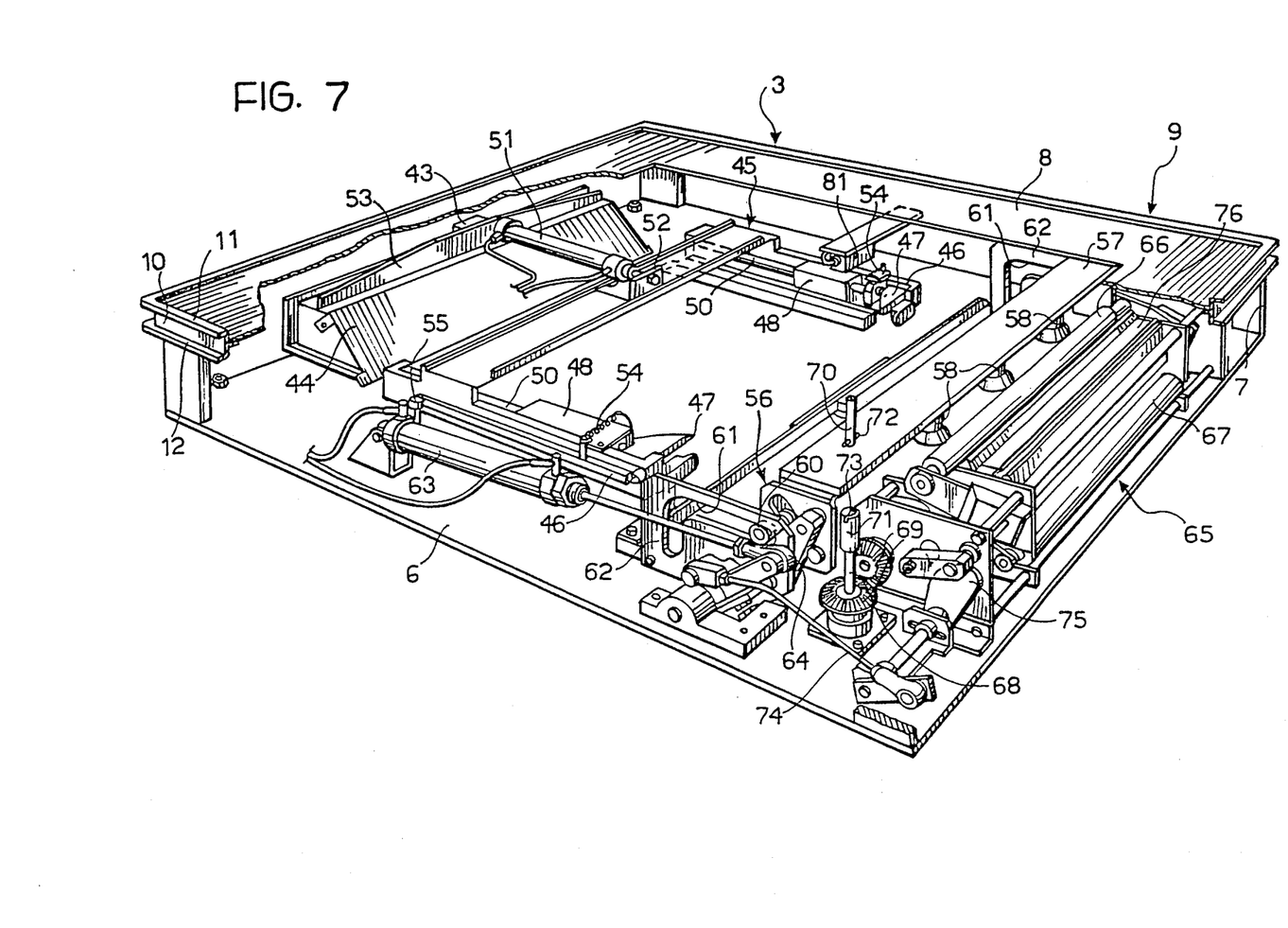
FIG. 7 is a partially sectioned perspective view of one of the magazine-carrying units of the apparatus.
Figure 12:
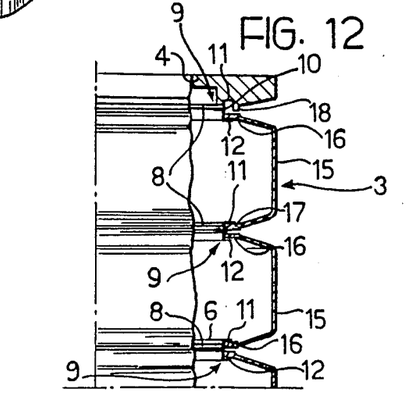
FIG. 12 is a section view and in larger scale along line XII—XII of FIG. 1.
Figure 13:
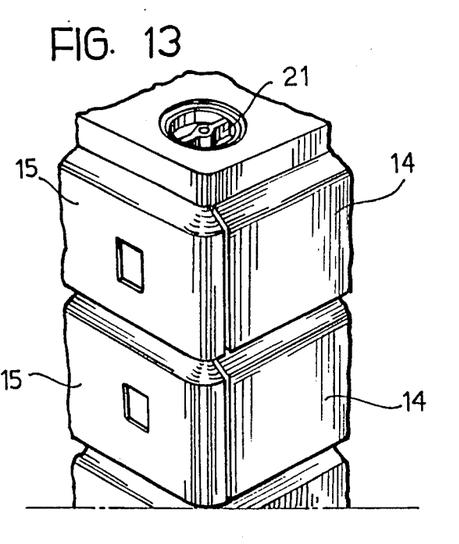
FIG. 13 is a partial perspective view in larger scale according to arrow XIII of FIG. 1.

Every magazine-carrying unit 3, shown as a whole in FIG. 7, comprises a supporting metallic structure consisting of a ground quadrangular plate 6 containing secured thereto upright support elements 7 carrying at the top thereof a supporting frame 8 perimetrically delimited by a channel section element 9 with a recess 10 turned towards the outside and delimited by respectively upper 11 and lower 12 ledges. As clearly shown in FIG. 12, the supporting frame 8 supports the ground plate 6 of the overlying unit 3, with the edge of said ground plate 6 inserted into the section element 9 which in this way acts as a centering element while positioning the upper unit 3. Although not strictly necessary, screw securing elements (not shown in the drawings) may be provided to secure rigidly the supporting frame 8 of the underlying unit 3 with the ground plate 6 of the overlying unit 3. Such screw elements can be placed for instance in correspondence with the top of the respective metallic frames.

The light-tight connection between each couple of superimposed units 3 is achieved by means of plastic material protecting shields, more particularly four peripheral, respectively front 13, back 14 and side 15, protecting shields (FIG. 1) for each unit. As shown with greater details in FIGS. 12 and 14, the shields themselves have a curved profile with concavity towards the inside of the unit and have longitudinal edges, respectively upper 16 and lower 17, complementary engaging in the recess 10 of the channel section elements 9 (with upper 11 or lower 12 ledges. The engaging upper edge 16 of every protecting shield 13-15 is introduced into the lower region of recess 10 of the corresponding side of the channel section element 9 of the pertinent magazine-carrying unit 3 and the lower edge 17 is introduced into the upper region of recess 10 of the corresponding side of the channel section element 9 and of the underlying magazine-carrying unit 3. The protecting shields 13-15 are secured, as explained hereinafter, to the relative units 3. By means of the above described assembling, a stable connection among every couple of adjoining units 3 is thus realized quickly and easily.

Figure 14:
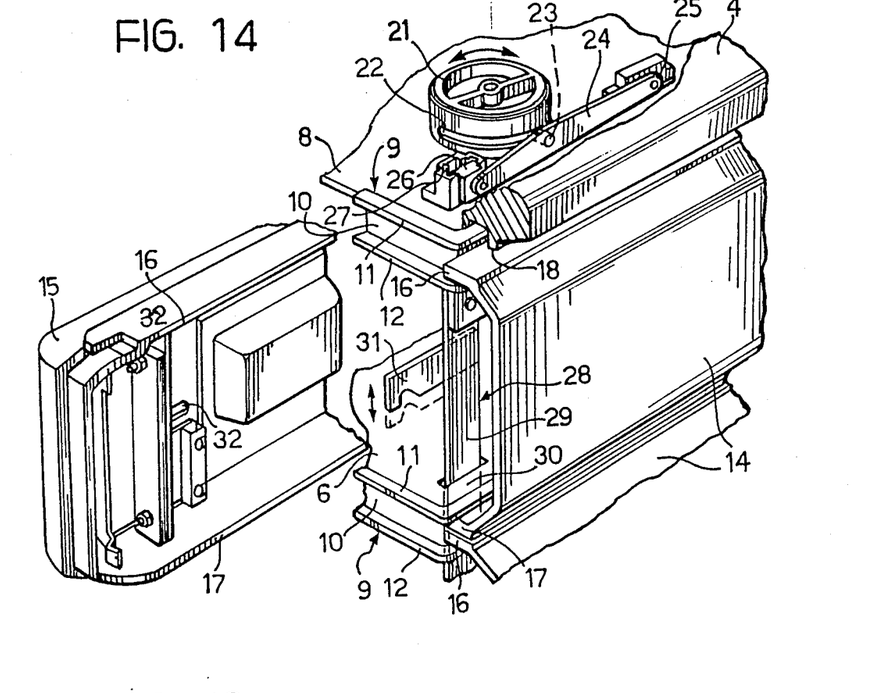
FIG. 14 is an exploded and partially sectioned view of FIG. 13.

As regards the upper magazine-carrying unit 3, the upper region of recess 10 of the pertinent channel section element 9 acts as a housing receiving and engaging the top protecting unit 4 which, as shown in details in FIG. 14, is provided with a perimetrical complementary engagement edge 18 suitable for light-tight engaging within such section element 9. Unit 4 can be secured with screws 19 (FIG. 1).

Figure 2:
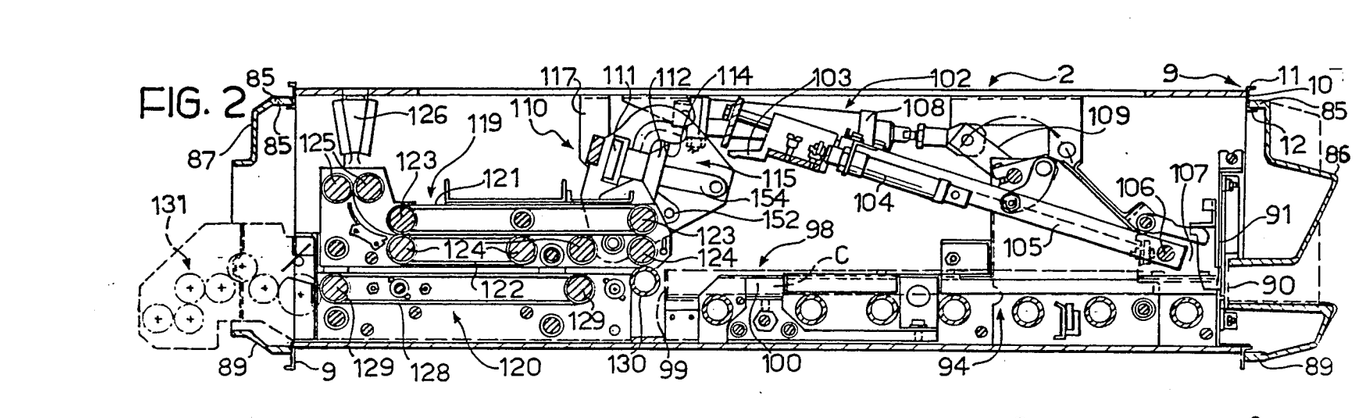
FIG. 2 is a sectional view in larger scale of the apparatus along line II—II of FIG. 1.
Figure 3:
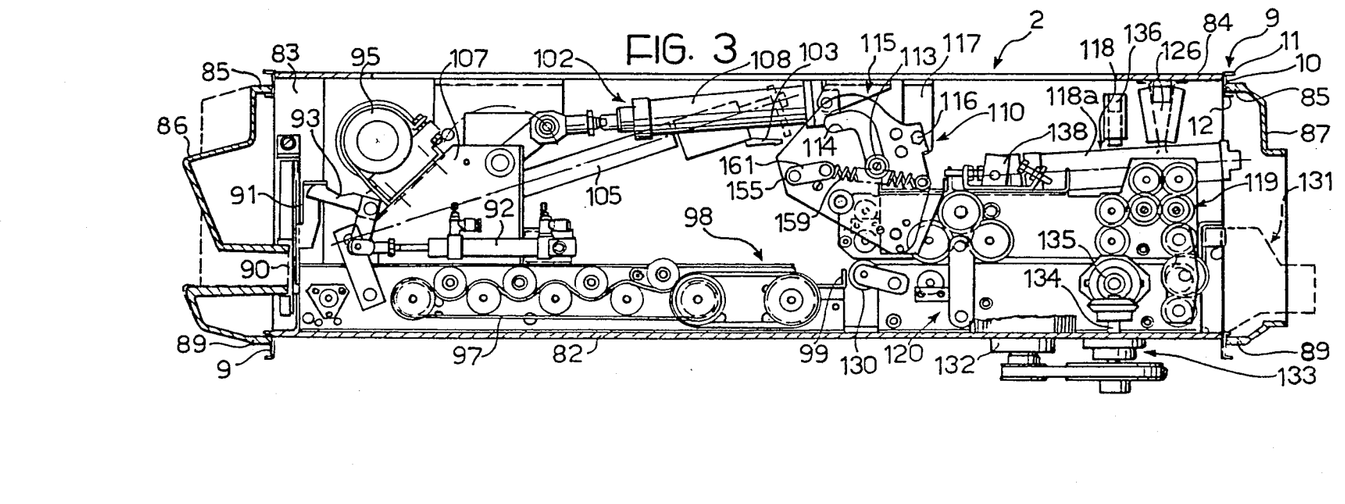
FIG. 3 is a sectional view in larger scale along line III—III of FIG. 1.
Figure 4:
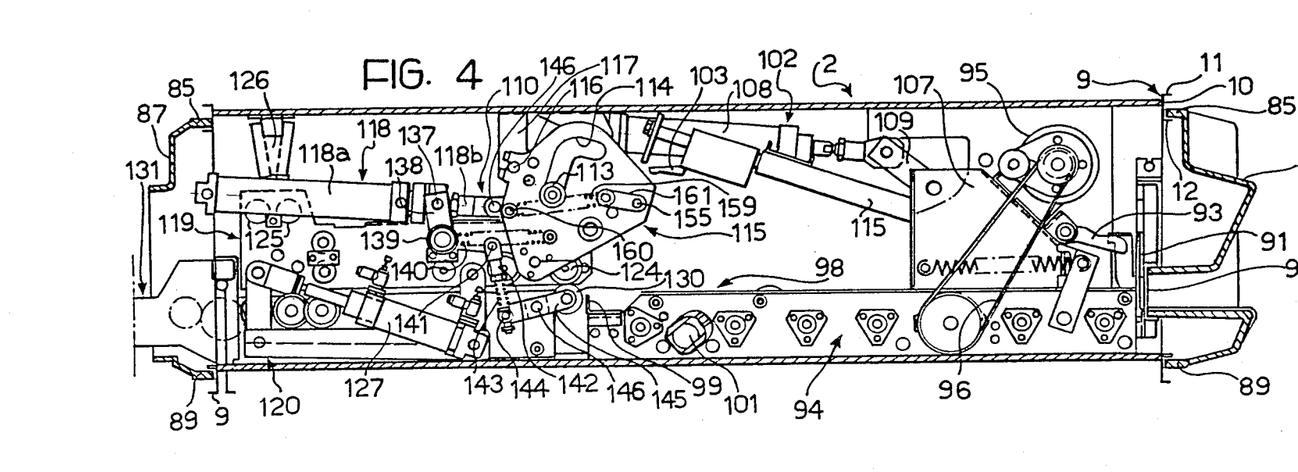
FIG. 4 is a sectional view in larger scale along line IV—IV of FIG. 1, FIGS. 5 and 6 are two schematic views of a detail of the apparatus of FIGS. 2 to 4 in two different subsequent working positions.

As regards the lowest magazine-carrying unit 3, the lower edges 17 of the relative protecting shields 13-15 engage with the upper regions of recess 10 of a similar channel section element 9 with which the cassette-carrying unit 2 is similarly provided as explained hereinafter (FIGS. 2 to 4).

Figure 15:
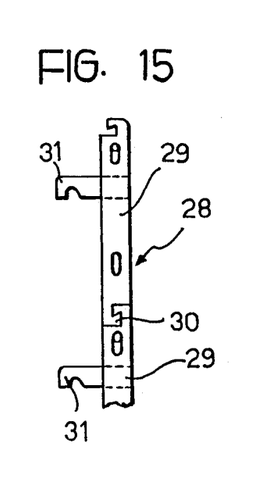
FIG. 15 illustrates in elevation a detail of the apparatus of FIG. 14

As explained previously, the protecting shields 13-15 are fixed to the respective unit 3, and such fixing is performed in a manner which allows quick and easy release. Particularly, the front protecting shield 13, the back protecting shield 14 and one of the side protecting shields 15 are suitable for connecting to the column 7 of the corresponding unit 3 by means of internal screw fastening means, i.e. invisible from the outside, not shown in the drawings. For the other side protecting shields, on the contrary, an interconnecting system is provided which acts through internal latch engagement means, according to what is shown in FIGS. 14 and 15. Such system includes a revolving knob 21 projecting through the top protecting unit 4 and carrying a side cam profile 22. A follower pin 23, carried by an oscillating lever 24, engages with the cam profile 22. The lever 24 is hinged at one end to a support 25 which is applied to the supporting frame 8 of the upper magezine-carrying unit 3. The other end of the oscillating lever 24 is hinged to a slider 26, which is vertically slidable in a guide 27, fixed to the frame 8 of the upper unit 3 as well, and is provided with a vertical bar 28 fixed thereto. Such bar 28, as shown in FIG. 15, is formed by consecutive portions 29, each associated to a respective unit 3, said portions 29 being joined each other at the ends by means of fit-in joints 30. each portion 29 cerries a latch hooking device 31 which cooperates with complementar hooking part 32 carried by an end of the side wall 15. The opposting end of the wall 15 is suitable for connecting, in a manner which is not shown, with the column 7 of the metallic frame of the respective unit 3 by means of an openable hinge-type articulation.

It will become evident that, by rotating the knob 21 in either directions, raising or lowering of the bar 28 by means of the oscillating lever 24 and, consequently, the simultaneous disengagement or engagement of latch means 31 relative to the hooking parts 32 is obtained. Therefore, in practice, by an easy single manual operation disengagement or engagement of the side walls 15 from the corresponding units 3 is performed. This makes much easier all possible inspection operations of the apparatus and possible substitutions, additions or reductions of the magazine-carrying unit 3.

Figure 11:
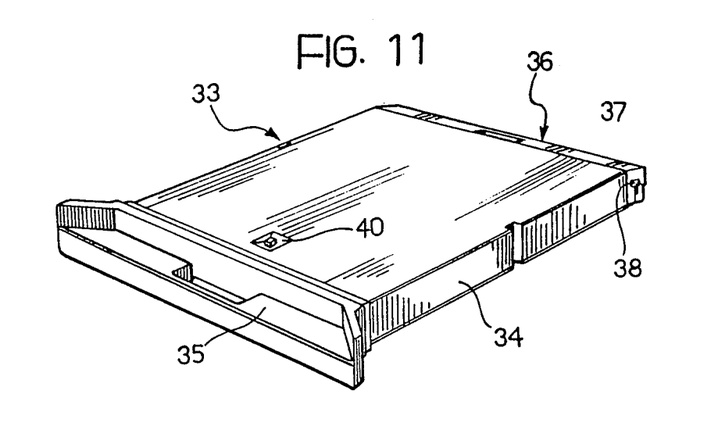
FIG. 11 is a perspective view of a feeding magazine used in the apparatus.

Each of such magazine-carrying unit 3 is suitable for light-tight receiving a feeding magazine, shown as a whole at 33 in FIG. 11, containing a packet of x-ray films having a certain size. The feeding magazine 33 comprises a case 34, provided at one end with a thickened portion 35 and having the opposite end which is open for insertion of a drawer 36 containing the films and is movable between a closed light-tight position in the case 34 (FIGS. 11 and 8) and an open position out of said case to allow the film removal operations. The drawer 36 on its front is provided with a head 37 carrying striker elements for perfectly centering the films inside the drawer, as well as with side notches 38 with which the movement of drawer 36, as explained hereinafter, is controlled. The opposite end of such drawer 36 is shaped so as to cooperate with a latch hooking element 39 carried by a bushing 40 movable in the back portion of case 34. The latch hooking element 39 constitutes means for locking drawer 36 in the closed position to allow an easy handling of the feeding magazine 33.

Figure 8:
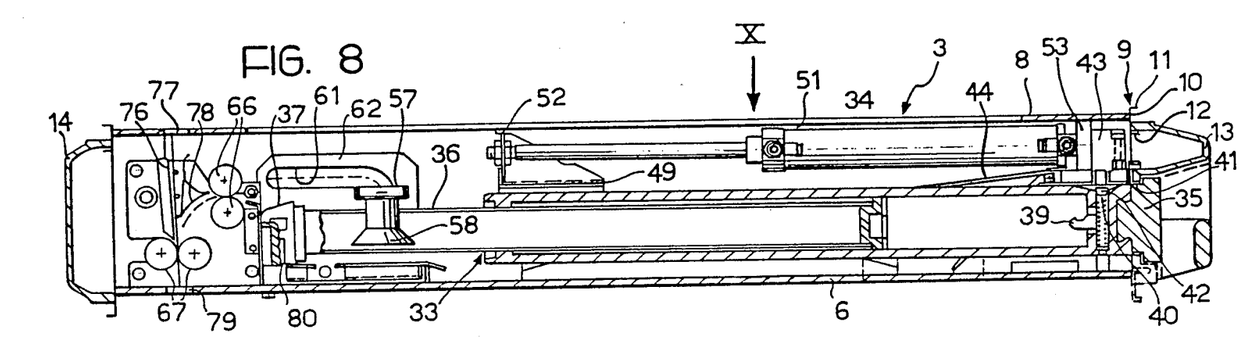
FIG. 8 is a sectional view in larger scale along line VIII—VIII of FIG. 1.
Figure 9:
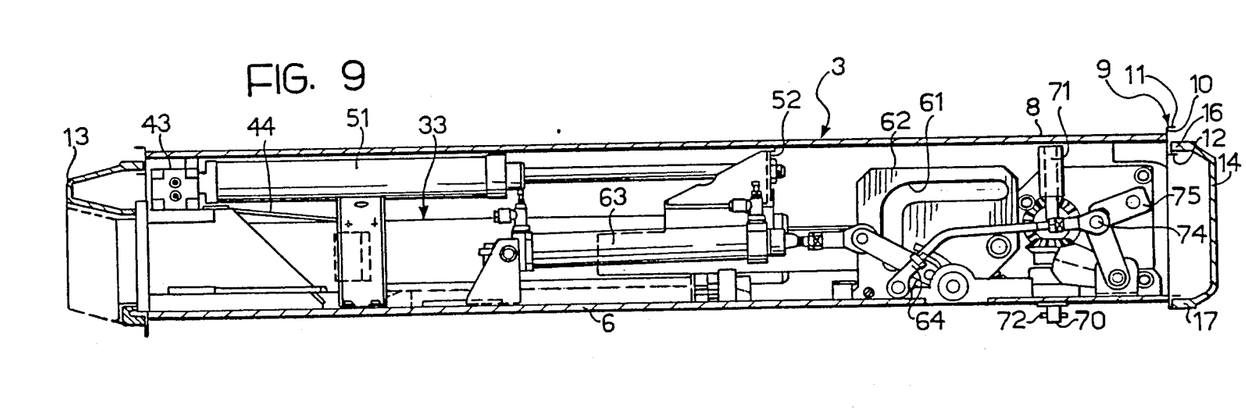
FIG. 9 is a sectional view in larger scale along line IX—IX of FIG. 1.
Figure 10:
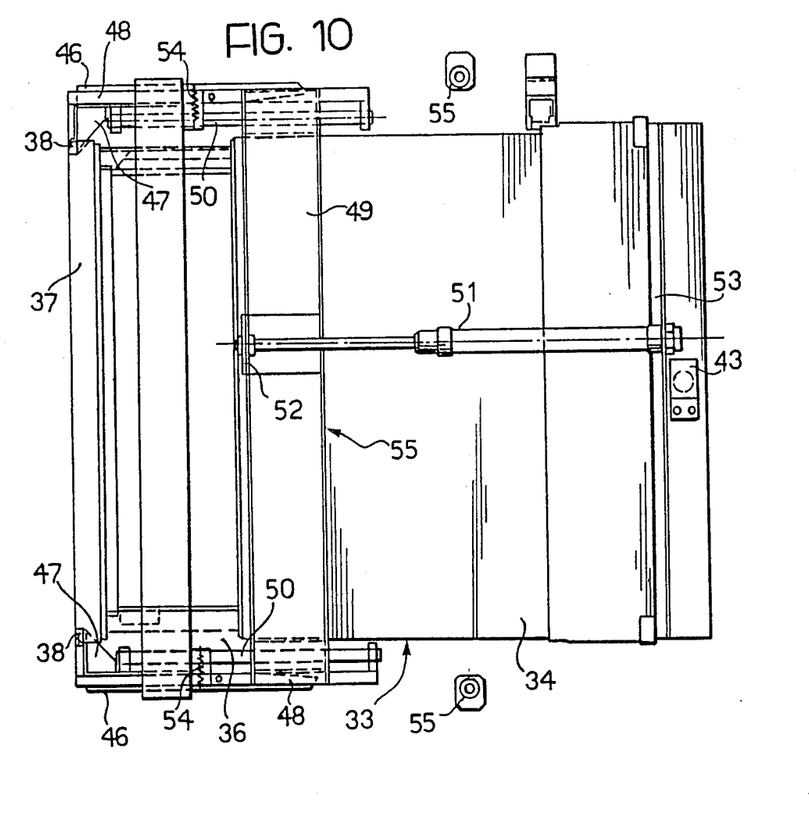
FIG. 10 is a schematic plan view according to arrow X of FIG. 8.

The magazine 33 is introduced into the inside of the magazine-carrying unit 3 through an inlet opening 41 made in the front protecting shield 13. After its introduction, the magazine 33 is placed, as shown in FIG. 8, parallel to the ground plate 6 with the light-tight headed end enlarged portion 35 against the edge of the inlet opening 41. It is noteworthy that the case 34 of magazine 33 is normally provided with an indentification code (not shown in the drawings) electrically readable by a sensor, not shown, connected with the electronic controlling unit of the apparatus. This allows detection and consequently enables intervention of the magazine-carrying unit 3 corresponding to the size and type of the film from time to time required by the user by introducing an x-ray cassette having the same identification code.

Every magazine-carrying unit 3 incorporates magazine handling means for the movement of drawer 36 and magazine 33, for grasping and taking out one film at a time from said drawer 36 and for conveying such film towards the cassette-carrying unit 2.

More in particular, starting near the inlet opening 41, every unit 3 is provided with a release group for the latch element 39 comprising a pressure-exerting element 42 capable of interacting with bushing 40 and vertically shiftable between a stand-by raised position and a lowered unlocking position by means of a pressurized fluid actuator 43. A swinging protecting shutter, normally kept by gravity in the turned position shown in FIGS. 7 and 9 for light-tight closing the inlet opening 41 in absence of magazine 33 is placed downstream such unlocking device, with respect to the introduction path of magazine 33. When the magazine 33 is introduced, as shown in FIG. 8, the protecting shutter 44 moves to the raised position.

A grasping group for drawer 36 of magazine 33, comprises spreadable and contractable jaws 46 provided with grasping elements 47 suitable to engage notches 38 of head 37 of drawer 36. The jaws are carried in an articulated fashion by a movable U-shaped support including two claws 48 connected by a beam 49. Claws 48 can slide along respective guides 50 carried by the ground plate 6 between a backward position, shown in FIG. 7, and a forward position shown in FIGS. 8 to 10. Such sliding is obtained by means of a pneumatic jack 51 having an end 52 connected with the mean portion of the beam 49 and the opposite end connected with a support 53 associated with the protecting shield 44. Guides 50 and jack 51 constitute a movement group for the grasping group.

Every guide 50 contains associated therewith a roller striker 55 having the function of spreading jaws 46, which are normally kept in the contracted position by respective drawing springs 54, at the end of the backward movement of structure 45.

Under 56 there is shown a film removal group including a crosspiece 57 carrying a set of suction devices connected with a vacuum source contained in the ground unit 1 and provided at its ends with supporting rollers 60 engaged in L-shaped slits 61 made in supporting side plates 62. The supporting crosspiece 57 can be shifted along the guiding slits 61 between a stand-by backward raised position, shown in FIG. 7, and a working forward lowered position, shown in FIG. 8, by means of a pressurized liquid jack 63 placed beside structure 45 and by means of a transmission leverage, generally shown with 64. Jack 63 and transmission leverage 64 constitute a movement group for the film removal group.

At the end of unit 3 opposite the inlet opening 41 there is placed a carrying group, shown as a whole with 65, including a first set of motor-driven superimposed rollers 66 and a second set of motor-driven rollers 67 placed one beside the other. The motor-drive of rollers 66 and 67 derives from the cassette-carrying unit 2, in the way explained hereinafter, through a vertical shaft 68 and bevel gears 69 (acting as actuator means). Shaft 68 is supported during rotation by the ground plate 6 and at the bottom is provided with a tang 70 provided with a clutch cross pin 72. The upper end of the shaft 68 carries a bushing 71 provided with a diametrical notch 73 complementary to pin 72. Tang 70 with pin 72 is suitable to fit bushing 71 with the relative notch 73 of the under-lying magazine-carrying unit 3, while bushing 71 with notch 73 is suitable to receive tang 70 with pin 72 of the above-lying magazine-carrying unit.

The two superimposed rollers 66 are suitable to be driven by the film removal group 56, in the way explained hereinafter, and to this purpose the upper roller 66 can be moved away from the lower roller 66 synchronously with the working of said film removal group 56. In fact, in the last step, such movement is directly controlled by jack 63 through an actuating group constituted by a leverage generally shown with 74 and a cam mechanism 75. The two side-by-side rollers 67 are placed on the contrary below a direct conveyance mouth 76 placed in correspondence of a slit 77 made in the supporting frame 8 and are suitable to be driven by the two superimposed rollers 66 through a diverging element 78. The two side-by-side rollers 67 are placed above a slit 79 made in the ground plate 6 and corresponding to slit 77 of the under-lying magazine-carrying unit.

Unit 3 further comprises a couple of vertical striker pins 80 (FIG. 8), secured in spaced positions to the ground plate 6 and suitable to cooperate with the photographs centering means with which drawer 36 of magazine 33 is provided.

An optical sensor 81, carried by the supporting frame 8, is furthermore provided to detect the presence or not of photographic films inside drawer 33. Such sensor 81 is connected with the apparatus control unit to generate an alarm signal in the case when magazine 33 contained in unit 3 is empty.

Each magazine-carrying unit works in the following way.

After having introduced the feeding magazine 33 through the inlet opening 41, the working of actuator 43 is first enabled by a signal coming from the control unit located in the ground plate (1) of the apparatus; by means of the actuator, disengagement of the latch element 39 is performed, releasing the drawer 36 with respect to case 34 of magazine 33 and, at the same time, preventing the magazine 33 from being drawn out once that drawer 36 has been released with respect to case 34.

After that, actuator 51 intervenes and controls the shift of structure 45 carrying jaws 46. During the first step of the forward movement, such jaws 46 disengage from their respective rollers 55, thus starting the contraction swinging under the action of springs 54 which causes grasping elements 47 to engage in notches 38 of head 37 of drawer 36. As structure 45 moves forward more and more, drawer 36 is made to slide towards the outside of case 34, to make the films contained therein accessible. The forward movement of structure 45 continues till head 37 engages with striker pins 80, thus causing the x-ray films to be centered.

At this point, the removal group 56 intervenes shifting suction devices 58, carried by crosspiece 57, from the backward raised position to the forward lowered position. Such suction devices 58 place then in contact with the x-ray film packet contained in drawer 36 to take out the film placed at the top of the packet. Suction devices 58 are then shifted to the backward shifting position. In such movement, they carry the x-ray film which in the meanwhile is introduced between the two transport rollers 66. Such an introduction is made easier by the fact that, as said previously, in the last step of the backward movement of suction devices 58, the upper roller 66 is moved away from the lower roller 66. Suction devices 58 are then disactivated and rollers 66 brought near again such as to grasp and carry the film to rollers 67 through diverging element 78. The film slides out from unit 3 through slit 79 and, through conveying mouths 76 and rollers 67 of the under-lying magazine-carrying units 3, reaches the cassette-carrying unit to be handled thereby in the way described hereinafter.

All above described operations occur according to a fully automatic operational cycle, synchronized with the aid of conventional position and end-of-run sensors connected with the apparatus control unit.

With reference to FIGS. 2 to 4, the features of the cassette-carrying unit 2 are now described in details.

The cassette-carrying unit 2 has a structure in general like that of the magazine-carrying units 3, consisting of a supporting metallic structure including a ground plate 82, a column on the supporting corners 83 and an upper frame 84 to support the lower magazine-carrying unit 3 to which the above described section element 9 is peripherally secured. The upper portion of recess 10 of such section element 9 contains introduced therein the lower edges 17 of the protecting shields 13–15 of the lowest magazine-carrying unit 3, while the lower portion of such recess 10 contain introduced therein the upper edges of similar front 86, back 87 and side 88 protecting shields applied at the outside of the cassette-carrying unit 2. The lower edges 89 of such protecting shields 86–88 engage into a similar section element 9 carried at the top of ground unit 1.

An inlet mouth 90 is formed in the front protecting shield 86 used to introduce into unit 2 a cassette for exposing a conventional x-ray film, schematically shown in FIG. 2 with a dot line under C. As well-known to the man skilled in the art, cassette C consists of a flat container having the largest surface serving as a book-wise openable cover to take out and introduce the x-ray film.

The cassette-carrying unit 2 is provided with cassette handling means for positioning and centering cassette C, for opening and closing it, for taking out the exposed x-ray film and carrying it towards the apparatus outlet, for feeding a new x-ray film coming from one of the magazine-carrying units 3 and for introducing it to the inside of cassette C.

In details, the passage through inlet opening 90 is controlled by means of a vertically movable wall 91 which, for example, can be moved by a pneumatic actuator 92 and a cam leverage generically shown with 93 between a light-tight closure lowered position of such opening 90 and an opening raised position. Immediately down wall 91 there is provided a horizontal motor-driven roller transport group 94. Such rollers are driven by an electric motor 95 and a toothed belt drive 96, 97 to carry cassette C, introduced into unit 2, towards an opening and closing station generically shown with 98. Such station 98 is defined by a fixed front stop 99, against which the cassette C is pushed by the action of the roller introduction group 94, and by a couple of movable side stops 100 which can be brought near and moved away with respect to cassette C by means of a transverse pneumatic actuator 101.

Above the opening and closing station 98 there is placed an opening and closing group 102 including a hook element 103 suitable to engage a locking and unlocking element (which is conventional and not shown in the drawings) for the movable wall of cassette C. The hook element 103 can be shifted between a backward release position and a forward grasping position by means of a pneumatic jack 104 and is carried by a swinging arm 105 articulated, by a pivot 106, to a fixed support 107 so that it can swing between a stand-by raised position, shown in the drawings, and a working lowered position wherein the hook element 103 places adjacent to cassette C. The movement of the swinging arm 105 is controlled by means of a pneumatic jack 108 and a leverage generically shown with 109.

Under 110 there is shown as a whole a removal group for removing the film from cassette C, including a supporting crosspiece 111 carrying a set of suction devices 112 connected with a vacuum source contained in the ground unit 1 and provided at the ends thereof with supporting rollers 113 movable in two L-shaped guiding slots 114 formed in two side plates 115 connected with an upper supporting element 117. The movement of crosspiece 111 carrying the suction devices 112 is controlled by means of a pneumatic jack 118, in the way explained hereinafter; jack 118 constitutes a movement group for the removal group 110.

The term "group", as normally used herein, is to indicate a mechanical/electrical element or an associated collection of elements that perform a task. For example, an unloading group would be that machinery, within a single or multiple unit, that acts to perform the task of unloading the film.

Under 119 and 120 there are respectively shown a film feeding group for feeding film towards the opening and closing station 98 and a film unloading group for removing the film from the opening and closing station 98. The feeding group 119 comprises two belt carriers 121, 122 driven by means of powered rollers 123, 124 and a couple of sidewise placed inlet rollers 125 placed under a conveying mouth 126 through which the films coming from the magazine-carrying unit 3 are sent to the cassette-carrying unit 2. The feeding group 119 is assembled so that it can run with respect to station 98 between a backward film-receiving position and a forward film-delivering position by means of a pneumatic jack 127 which therefore constitute a movement group for the feeding group 119.

The unloading group 120 comprises a belt carrier 128 and powered rollers 129 driven by a couple of inlet rollers, placed one above the other, the upper one of which consists of the end roller 124 of the feeding group 119 and the other one, shown with 130, can be moved away from said roller 124 in the way explained hereinafter. Carrier 128 of the unloading group 120 feeds a powered roller outlet group 131 where such rollers are connected, for instance, with the inlet of a conventional-type automatic processor for processing (developing and fixing) the films drawn out from cassettes C.

The working of rollers 123, 124, 129 and 130 is achieved by means of an electrical motor 132 contained in unit 2 and a drive 133 including a revolving vertical shaft 134 and a couple of bevel gears 135. The top of shaft 134 carries a bushing 136 like bushings of shafts 68 of the magazine-carrying unit 3. Bushing 136 is suitable to engage pin 72 connected with lower tang 70 of shaft 68 of the lower magazine-carrying unit 3: in this way rollers 66 and 67 of the carrying groups 65 of unit 3 are worked at the same time with feeding group 119 and unloading group 120 of unit 2 by means of the same motor 132.

Figure 5:
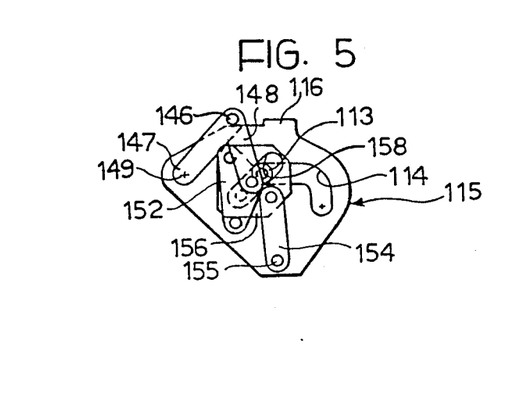
Figure 6:
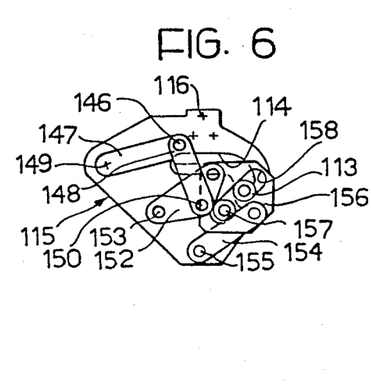

The features of the film taking-out group 110 are now described in deeper details by making reference to FIGS. 4 to 6.

The cylinder of jack 118, shown with 118a, is articulated by a pivot 137 to a swinging fork support 138 which is in its turn articulated by a pivot 139 to the structure of the film feeding group 119. The swinging fork 138 on one side thereof carries a square arm 140 containing articulated therewith by a pivot 141 an end of a stem 142, the opposite end of which is assembled so that it can slide against the action of a helical compression spring 143 through an articulation element 144 having a rocking lever 145, which is centrally articulated by a pivot 146 to the unloading group 120 and carries the movable roller 130.

The stem of jack 118, shown with 118b, is articulated by a pivot 146 to compass levers 147, 148, the first of which is articulated by a pivot 149 to one of the side plates 115 and the other one is articulated by a pivot 150 to a link rod 152 articulated by a pivot 153 to plate 115. Rod 152 with a second rod 154 articulated by a pivot 155 to plate 115 defines an articulated parallelepiped system carrying a movable plate 156 articulated by a pivot 157 to the supporting crosspiece 111 having a slot 158 engaging one of the end rollers 113 of crosspiece 111 carrying the suction devices 112. A helical extension spring 159 is secured at one end to a pin 160 on plate 115 and at the other end with a lever 161 carried by pivot 155.

The above described kinematic motion enable the only actuator element 118 to perform the following operations: removing the film from cassette C and delivering it to the unloading group 130, moveing and getting near inlet roller 130 with respect to roller 124 and detecting the possible absence of the film inside cassette C during the removal operation.

The three steps described above are performed in the following way, when the cassette C has been introduced into unit 2 through inlet opening 90 (by raising and subsequently lowering wall 91) pushed against front stop 99 by introduction group 94, centered by means of the movable side stop 100, opened by lowering the opening-closing group 102, by activating the hook element 103 and subsequently re-raising such opening-closing group 102.

Initially, air under pressure is sent to jack 118 so as to extend it. Since such jack 118 is articulated as described hereinbefore, an anticlock-wise rotation with respect to FIG. 4 of swinging support 138 occurs around its articulation 139. This rotation causes stem 142 to be raised and rocking lever 145 to rotate clockwise, thus moving away inlet roller 130 from roller 124. Therefore, stem 142 and lever 145 constitute an actuator group for the rollers 124 and 130. During such step, side plates 115 and therefore crosspiece 111 carrying suction devices 112 are kept in the raised and backward position shown in FIGS. 2 to 4.

At the end of lowering roller 130, swinging support 138 stops and the outward run of stem 118b with respect to cylinder 118a of jack 118 begins. During the first step of such run, side plates 115 rotate around their respective pivots 149 from the raised position shown in FIGS. 2 to 4 to the lowered position shown in FIG. 5. In this step the extension spring 159 remains in its undeformed state.

At the end of rotation of plates 115, the further forward movement of stem 118b, by means of the above described leverage, causes the translation of crosspiece 111 with suction devices 112 along the two L-shaped slots 114 up to placing such suction devices 112 into the forward position shown in FIG. 6. This is obtained by wide-spreading compass levers 147, 148 thus moving plate 156 carried by the two parallelepiped levers 152, 154. During such step, the extension spring 159 is stretched and suction devices 112 are placed into contact with the x-ray film, contained in cassette C, which is thus taken out by connecting such suction devices with a vacuum source.

After such operation, jack 118 is fed in the opposite direction in order to achieve the contraction thereof. The backward movement of crosspiece 111 carrying suction devices 112 from the forward position of FIG. 6 to the backward position of FIG. 5 is caused by the returning action exerted by extension spring 159. The returning speed is controlled by jack 118 by means of throttling by the pressurized liquid unloading pipe. At the end of the spring contraction, cylinder 118a of jack 118 moves forward thus causing the swinging support 138 to rotate clockwise, bringing roller 130 near roller 124 and tightening the film taken out by suction devices 112. The film is then left by said suction devices and carried by rollers 124, 130 and the unloading group 120 towards the outlet group 131.

The striking of roller 130 against roller 124 allows stem 118b to enter again into cylinder 118a, thus repositioning side plates 115 from the lowered position shown in FIG. 5 to the raised position of FIGS. 2 to 4.

The final step consists of feeding a new x-ray film into cassette C, coming from the magazine-carrying unit 3 corresponding to the required size of such film. The film comes from the corresponding magazine-carrying unit 3 in the way explained hereinbefore and reaches the conveying mouth 126 and, through the sidewise placed rollers 125, the feeding group 119. This group is then caused to move towards station 98 by means of jack 127 so as to deliver the film to cassette C.

In case the preceding removal step is performed in absence of an x-ray film inside cassette C, such an absence is reported to the apparatus control unit directly by the removal group 110. In fact, in such event, the connection of suction devices 112 with the vacuum source, when these are placed in the forward position of FIG. 6, causes the adhesion thereof to the bottom of cassette C. Consequently, the further return step of suction devices 112 to the backward and raised position is prevented. However, since jack 118 is already driven to perform the outward movement and stem 118b is secured to the bottom of the cassette by means of the hereinbefore described levers and suction devices 112, cylinder 118a moves with respect to stem 118b thus causing swinging support 138 to rotate clockwise in FIG. 4 and, following the subsequent return of roller 130 to the raised position, stem 142 slides with respect to the articulation portion 144 to the swinging lever 145. The lower portion of stem 142 in this case strikes a conventional-type switch (not shown in the drawings) connected with an indicating device to the apparatus control unit, thus disconnecting suction devices 112 from the vacuum source. Therefore, stem 142 and lever 145 constitute a detector device for revealing the absence of the film in the cassette C.

At the end of a new film feeding step to cassette C, the opening-closing group 102 is activated to close such cassette C, and group 94 with movable wall 91 are worked to allow cassette C to come out through opening 90.

Even in this case, the above described components of the cassette-carrying unit 2 work in a fully automatic and synchronized way with the aid of position and end-of-run sensors (of the conventional type for the man skilled in the art and not shown) connected with the apparatus control unit.

Figure 16:
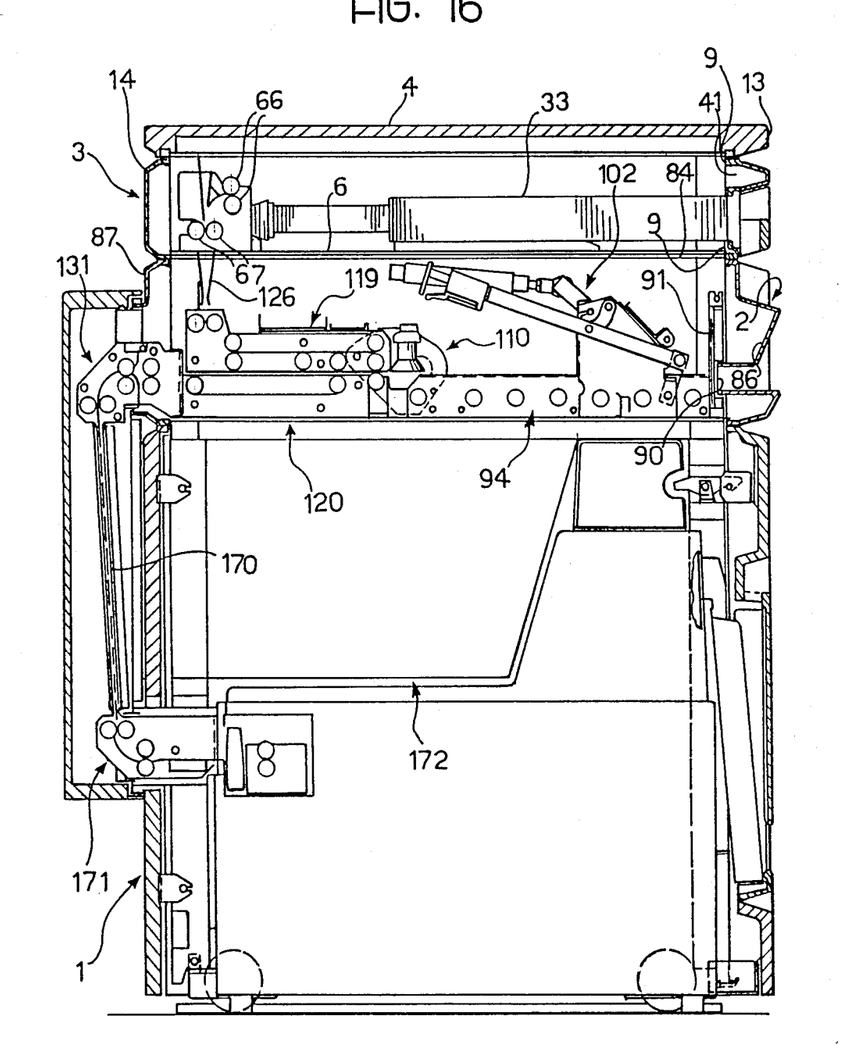
FIG. 16 is a schematic, partially vertical section view of a variant of apparatus of FIG. 1.

As said hereinabove, the number of magazine-carrying units 3 can vary according to the need of use of the apparatus of the present invention. In particular, FIG. 16 shows a variant employing a single magazine-carrying unit 3 placed above the cassette-carrying unit 2. This solution, which can be referred to as "basis" configuration of the apparatus, is suitable in those cases where the use of a single-size x-ray film magazine or of a limited number of different-size x-ray film magazines is foreseen. With reference to FIG. 16, the apparatus comprises, as said, a single magazine-carrying unit 3 at the top of which there is secured, in the way explained hereinbefore, the top protecting unit 4; the ground plate 6 of the unit 3 is supported by frame 84 of the cassette-carrying unit 2. The shape of the magazine-carrying unit 3 and of the cassette-carrying unit 2 is the same as that of FIG. 1. In this case the outlet group 131 of the cassette-carrying unit 2, through a guiding element 170, feeds a motor-driven roller inlet group 171 of an x-ray film automatic processor schematically shown with 172. Such processor, of a type per se known, is incorporated in the lower portion of the ground unit 1. As said hereinbefore, the perimetrical striker elements, placed between the magazine-carrying unit and the top covering unit, can be L-shaped with a single horizontal lower striker edge.

The construction details and the embodiments of the present invention can be of course varied widely with respect to what is described and illustrated, without falling however out of the present invention.

I claim:

1. An apparatus for day-light loading and unloading of an x-ray film cassette, comprising first light-tight housing means for a feeding magazine including unexposed x-ray films, second light-tight housing means for the cassette, magazine handling means operating in said first housing means for removing an unexposed x-ray film from the feeding magazine, cassette handling means operating in said second housing means for removing an exposed x-ray film from the cassette and introducing an unexposed x-ray film into the cassette, powered actuator means for said magazine and cassette handling means and interfunctional service means for said actuator means and cassette and magazine handling means, characterized by comprising:

(a) a plurality of distinct and superimposed units, each comprising a self-supporting structure (6,7,8), said plurality including:
 i. one ground unit (1), containing a major portion of said interfunctional service means,
 ii. one cassette-carrying unit (2), containing said second housing means and said cassette handling means,
 iii. at least one magazine-carrying unit (3), containing said first housing means and said magazine handling means,
(b) light-tight connecting means between superimposed units.

2. The apparatus of claim 1, characterized by said self-supporting structure being a top and side open parallelepipedal structure in which said light-tight connecting means include a peripherical element providing for first edge means attached to said structure and removable light protecting shields providing for second edge means for light-tight engagement with said first edge means.

3. The apparatus of claim 2, characterized by said self-supporting structure being an open parallelepiped structure comprising a quadrangular plate (6), upright support elements (7) secured to said plate (6), an upper supporting frame (8) carried by said support elements (7) and said light-tight connecting means comprising removable light protecting shields (13,14,15; 86,87,88) light-tight secured to said self-supporting structure.

4. The apparatus of claim 3, characterized by said upper supporting frame (8) having a perimetrical channel section element (9) with an outwardly turned recess (10) delimited by upper and lower edges (11,12) and said removable light protecting shields (13,14,15; 86,87,88) having upper and lower edges (16,17) for complementary engaging in said recess (10).

5. The apparatus of claim 4, characterized by the fact that said plurality of units further includes a top protecting unit (4), placed in contact on the upper magazine-carrying unit (3), provided with an engagement edge (18) for light-tight engaging the channel section element (9) of the underlying magazine-carrying unit (3).

6. The apparatus of claim 4, characterized by the fact that said cassette-carrying units (2) and magazine-carrying units (3) have a quadrangular flat profile and said removable light protecting shields (13,14,15) are four for each unit (2,3), three of which are secured to the corresponding unit (2,3) with internal screw fastening means, and by the fact that internal latch engagement means (31,32) are provided to lock from the outside in a releasable way a fourth protecting shield (15).

7. The apparatus of claim 6, characterized by the fact that the fourth protecting shield of the magazine-carrying unit (3) is a back protecting shield (14) and the fourth protecting shield of the cassette-carrying unit (2) is a side protecting shield (15), by the fact that said latch engagement means (31,32) are cinematically interconnected and by the fact that a single external control element (21) is provided for the simultaneous engagement and release of said latch engagement elements.

8. The apparatus of claim 7, characterized by the fact that the external control element consists of a vertical axis revolving upper knob (21) carrying a face cam profile (22) cooperating with a swinging lever (24) which operates a vertical rod (28) carrying the above said latch engagement elements (31), said rod consisting of portions (29) each associated with a respective magazine-carrying unit (3) and to the cassette-carrying unit (2) and joined together by means of joint connections (30).

9. The apparatus of claim 3, characterized by the fact that the upper supporting frame (8) of each unit (1,2,3) defines a vertical edge which provides for centering of the superimposed unit (2,3).

10. The apparatus of claim 1, wherein the magazine-carrying unit (3) are arranged to receive an x-ray film feeding magazine including a flat cassette and a drawer movable with respect to the cassette between a closed light-tight position and an opened position, and means for locking the drawer in said closed position, characterized by the fact that each of said at least a magazine handling means comprises:
- a release group (42,43) of said locking means (39,40),
- a grasping group (46,47) for engagement with the drawer (36) of the feeding magazine (33),
- a movement group (50,51) for the grasping group to actuate the movement of the drawer (36) between said closed and opened position,
- a film removal sucking group (56) which can be moved between a backward stand-by position and forward working position,
- a movement group (63,64) for the film removal group to actuate the movement thereof between said stand-by and working positions synchronously with the movement group (50,51) for the grasping group,
- a roller carrying group (65) driven by the film removing group (56) and including a couple of inlet opposite rollers (66) which are moved away one from the other at the arrival of a film taken by the removal group (56),
- an actuating group (74,75) for moving away said inlet rollers (66) including a cam leverage (75) operated by the movement group (63,64) of the film removal group (56) in the final step of the backward movement thereof from the working to the stand-by position.

11. The apparatus of claim 1, characterized by the fact that said cassette handling means comprises:
- a motor-driven roller group (94) for introducing and positioning the cassette (C) including an inlet opening (90) provided with a roller shutter movable wall (91) and actuator means to actuate the opening and light-tight closure thereof and front and side stop means (99,100) for the centering of the cassette (C) defining an opening and closure station (98) of the cassette (13),
- an opening and closing group (102) for the openable wall of the cassette (C) placed in an overhanging position to the opening and closing station (98) and including a hook element (103) movable between a release backward position and forward grasping position and between a stand-by raised position and a working lowered position, and actuator means (104,108) to actuate the movements of said hook element (103) among the above mentioned positions,
- a film removal sucking group (110) movable with respect to the opening and closure station (98) between a backward raised release position and a forward lowered grasping position,
- a movement group (118) for the removal group (110) to actuate the movement thereof between said backward raised position and said forward lowered position,
- a motor-driven carrier (121,122) film feeding group (119) having an inlet side (125, 126) subject to receive the films coming from the carrying means (65) of the magazine-carrying units (3) and an outlet side (123,124) turned towards said opening and closure station (98), said feeding group (119) being movable between a backward position and a forward position,
- a movement group (127) for said feeding group (119) to actuate the movement thereof between said backward and forward positions synchronously with said removal group (110),
- a film unloading group (120) including opposite inlet rollers (124,130) which can be moved away one from the other at the arrival of the film from the removal group (110),
- an actuator group (142,145) operating the movement-away of said inlet rollers (130,124),
- a film outlet group (131) driven by said unloading group (128), and
- a detector device (142,145) revealing the absence of the film in the cassette (C) associated with said removal group (110).

12. The apparatus of claim 11, characterized by the fact that the movement group of the removal group (110) comprises a single actuator element (118) suitable to operate said removal group (110), the movement-away of said inlet rollers (130, 124) of the unloading group (120), as well as said film detector device (142,145).

13. The apparatus of claim 12, characterized by the fact that said actuator element consists of a pressurized liquid jack having a cylinder (118a) and a stem (118b), and said movement group of the taking-out group (110) comprises:
- a swinging support (138) to which the cylinder (118a) of said jack (118) is articulated,
- a supporting structure including a crosspiece (111) carrying said suction devices (112) and side plates (115) carrying said crosspiece (111), said plates being revolvable between said raised and lowered positions and being provided with guiding means (114) to allow the movement of the crosspiece (111) between said backward and forward positions, said plates further carrying parallelogram connecting means (146–158) articulated between said crosspiece (111) and the stem (118b) of the jack and elastic returning means (159) placed between said articulated parallelogram connecting means (146–158) of the above said plates (115),
- a swinging lever support (145) carrying one of said inlet rollers (130),
- a drive to actuate the swinging of said swinging lever support (145) and including a stem (142) which can be translated by the swinging of said swinging support (138) and is slidingly connected with said swinging lever support (145) to operate said film absence detector device, elastic means (143) being provided to oppose said sliding of said stem (142) with respect to said swinging lever support (145).

14. An apparatus of claim 1 for day-light loading and unloading of an x-ray film cassette, comprising a first light-tight housing means for a feeding magazine of unexposed x-ray film, a second light-tight housing means for the cassette, a magazine handling means operating in the first housing means for removing an unexposed x-ray film from the feeding magazine, a cassette handling means operating in the second housing means for removing an x-ray film from the cassette and for introducing an unexposed x-ray film into the cassette, powered actuator means for said film handling means and for said cassette handling means, interfunctional service means for said actuator means, characterized by comprising:
- (a) a plurality of distinct and superimposed units, each comprising a self-supporting structure (6,7,8), said plurality including:
  - (i) a ground unit (1) containing the major portion of said interfunctional service means,
  - (ii) a cassette-carrying unit (2) placed in contact with the ground unit (1), containing said second housing means and said cassette handling means,
  - (iii) a magazine-carrying unit (3) placed in contact with the cassette-carrying unit (2), containing said first housing means and said magazine handling means,
  - (iv) a top protecting unit (4) placed in contact with the magazine-carrying unit (3),
- (b) light-tight connecting means, between units, including:
  - (i) an upper supporting frame (8) attached to said self-supporting structure of each of said ground unit (1) and cassette-carrying unit (2),
  - (ii) a perimetrical channel section element (9) attached to said upper supporting frame (8) with an outwardly turned recess (10),
  - (iii) removable light protecting shields (13,14,15; 86,87,88) around said cassette-carrying unit (2) light-tight engaged in the recess (10) of said channel section element (9).

* * * * *